(12) United States Patent
Onaizi et al.

(10) Patent No.: US 12,441,930 B1
(45) Date of Patent: Oct. 14, 2025

(54) WELLBORE AND GEOLOGIC FORMATION DESULFURIZATION PROCESS

(71) Applicant: KING FAHD UNIVERSITY OF PETROLEUM AND MINERALS, Dhahran (SA)

(72) Inventors: Sagheer A. Onaizi, Dhahran (SA); Mustapha Iddrisu, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/073,674

(22) Filed: Mar. 7, 2025

Related U.S. Application Data

(63) Continuation of application No. 18/809,440, filed on Aug. 20, 2024, now Pat. No. 12,275,892.

(51) Int. Cl.
| | | |
|---|---|---|
| *C09K 8/54* | (2006.01) | |
| *B01D 53/52* | (2006.01) | |
| *B01D 53/80* | (2006.01) | |
| *B01J 20/06* | (2006.01) | |
| *B01J 20/30* | (2006.01) | |

(Continued)

(52) U.S. Cl.
CPC ............ *C09K 8/54* (2013.01); *B01D 53/52* (2013.01); *B01D 53/80* (2013.01); *B01J 20/06* (2013.01); *B01J 20/3085* (2013.01); *C01G 51/40* (2013.01); *C09K 8/16* (2013.01); *E21B 21/00* (2013.01); *E21B 41/02* (2013.01); *B01D 2251/604* (2013.01); *B01D 2257/304* (2013.01); *C01P 2002/22* (2013.01); *C01P 2002/30* (2013.01); *C01P 2002/72* (2013.01);
(Continued)

(58) Field of Classification Search
CPC . C09K 8/54; C09K 8/16; B01D 53/52; B01D 53/80; B01J 20/06; B01J 20/3085; E21B 21/00; E21B 41/02; C01G 51/40
See application file for complete search history.

(56) References Cited

U.S. PATENT DOCUMENTS

| 5,721,198 A | 2/1998 | Burba, III et al. |
|---|---|---|
| 11,708,517 B1 * | 7/2023 | Onaizi ............... C09K 8/16 166/304 |

(Continued)

OTHER PUBLICATIONS

Seongwoo LEE, et al., "CoFe-based layered double hydroxide for high removal capacity of hydrogen sulfide under high humid gas stream", Chemical Engineering Journal, vol. 416, Jul. 15, 2021, 127918, 4 pages.

*Primary Examiner* — Crystal J Lee
(74) *Attorney, Agent, or Firm* — Oblon, McClelland, Maier &Neustadt, L.L.P.

(57) ABSTRACT

A method of removing hydrogen sulfide from a subterranean geological formation includes injecting a drilling fluid suspension in the subterranean geological formation. The drilling fluid suspension has a pH of 10 or more and includes a layered triple hydroxide material, including manganese, cobalt, and iron, in an amount of 0.01 to 0.5 precent by weight of the drilling fluid suspension. The method further includes circulating the drilling fluid suspension in the subterranean geological formation and forming a water-based mud and scavenging the hydrogen sulfide from the subterranean geological formation by reacting the hydrogen sulfide with the layered triple hydroxide material in the water-based mud.

20 Claims, 7 Drawing Sheets

(51) Int. Cl.
  *C01G 51/40* (2025.01)
  *C09K 8/16* (2006.01)
  *E21B 21/00* (2006.01)
  *E21B 41/02* (2006.01)

(52) U.S. Cl.
  CPC ...... *C01P 2002/82* (2013.01); *C01P 2002/88* (2013.01); *C09K 2208/20* (2013.01)

(56) References Cited

U.S. PATENT DOCUMENTS

| | | |
|---|---|---|
| 2004/0030013 A1 | 2/2004 | Hoy |
| 2014/0231311 A1 | 8/2014 | Sandu et al. |
| 2017/0081580 A1* | 3/2017 | Maghrabi ................ C09K 8/36 |
| 2024/0018406 A1 | 1/2024 | Onaizi |
| 2024/0093107 A1* | 3/2024 | Onaizi .................... B01J 20/08 |

* cited by examiner

WELLBORE AND GEOLOGIC FORMATION DESULFURIZATION PROCESS

CROSS-REFERENCE TO RELATED APPLICATIONS

The present application is a Continuation of U.S. application Ser. No. 18/809,440, now allowed, having a filing date of Aug. 20, 2024.

The present disclosure claims the benefit of Saudi Patent Application No. 1020244161 filed on Jul. 25, 2024, with the Saudi Authority for Intellectual Property Office, which is incorporated herein by reference in its entirety.

STATEMENT OF ACKNOWLEDGEMENT

Support provided by the King Fahd University of Petroleum and Mineral (KFUPM) is gratefully acknowledged.

BACKGROUND

Technical Field

The present disclosure is directed to a method of hydrogen sulfide ($H_2S$) scavenging in a subterranean geological formation, more particularly, directed to a method of removing $H_2S$ from a subterranean geological formation with a layered triple hydroxide material in an aqueous drilling fluid.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hydrogen sulfide ($H_2S$) can be generated locally in gas and oil reservoirs by thermochemical reduction of sulfate by hydrocarbon decomposing microorganisms and/or indigenous microorganisms, such as sulfate-reducing bacteria, under anaerobic conditions. Thus, several crude oil and gas reservoirs contain $H_2S$. Exposure to $H_2S$ during gas and oil drilling operations creates several challenges and raises safety concerns during the drilling of subterranean geological formations. $H_2S$ is a toxic and highly corrosive gas and is poisonous to humans and animals and may be lethal at levels as low as 350 ppm within a short exposure time. The corrosive nature of $H_2S$ causes damage to metallic structures and equipment utilized in drilling operations, resulting in operational problems such as the interference with the downhole tools, including artificial lift equipment, and the like. Further, $H_2S$ may cause a loss in water injection wells and diminish well productivity due to the blockage of the wellbore. Furthermore, $H_2S$ is highly reactive and may decrease the lifespan of polymers and starches used to enhance the rheology of aqueous drilling fluids. Scavenging $H_2S$ during oil and gas drilling operations will assist in mitigating and/or eliminating health and operational issues.

Numerous techniques and compositions have been proposed for scavenging $H_2S$ from water-based drilling fluids during oil and gas drilling operations. U.S. Pat. No. 4,473,115A discloses a stabilized solution of chlorine dioxide ($ClO_2$) for the reduction of $H_2S$ present in drilling fluids. The disclosed scavenger was prepared by stabilizing the chlorine dioxide gas in an aqueous solution with alkali metal salts, including carbonates, bicarbonates, sulfate, borate and phosphate, and an active oxygen source including ozone ($O_3$), hydrogen peroxide ($H_2O_2$), urea peroxide, and the like. U.S. Pat. No. 4,548,720A discloses a method for removal of $H_2S$ during drilling of subterranean formations using powdered solid oxidants, such as calcium hypochlorite ($Ca(OCl)_2$), sodium perborate ($NaBO_3$), potassium peroxydisulfate ($K_2S_2O_8$), and potassium permanganate ($KMnO_4$). U.S. Pat. No. 4,756,836A discloses iron (Fe) chelate drilling fluid additives composed of a preferred chelating agent, such as EDTA, HEDTA, NTA, or DTPA, which may regenerate oxygen for removal of $H_2S$. The iron chelate scavenger reacts with $H_2S$ to liberate elemental sulfur. U.S. Pat. No. 6,365,053B1 discloses a sparingly soluble Fe(II) salt for the removal of $H_2S$ in both oil and aqueous drilling fluids during circulation. The preferred scavenger was an iron oxalate, which reacts with $H_2S$ to produce iron sulfide. U.S. Pat. No. 6,746,611B2 discloses a method and composition for removing $H_2S$ at a pH of at least 11 from drilling fluids during drilling of subterranean formations. The composition includes a ferrous gluconate which reacts with $H_2S$ to produce iron sulfide precipitate. U.S. Pat. No. 9,254,453B2 discloses a composition including a gluconate salt other than iron gluconate and a method where the scavenger is added to the drilling fluid along with an iron precursor if the fluid does not already contain iron ions. The iron precursor or iron ions present in the fluid reacts with gluconate salt within the drilling fluid to produce iron gluconate, which further reacts with $H_2S$ to precipitate iron sulfide and gluconic acid. The gluconic acid further reacts with iron to produce iron gluconate, which again reacts with $H_2S$. U.S. Pat. No. 9,587,181B2 discloses a method and composition that includes a transition metal salt and a water-soluble aldehyde-based precursor for scavenging $H_2S$ from aqueous fluids. The composition contains zinc or iron carboxylates as the transition metal salt and ethylene glycol semiformal as the water-soluble aldehyde precursor.

Although several water-based drilling fluids have been used in the past for scavenging hydrogen sulfide from subterranean geological formations, the above-mentioned methods may be inefficient, detrimental to the environment, and/or financially taxing. Thus, there arises a need for better techniques to scavenge $H_2S$ from subterranean geological formations. Accordingly, an object of the present disclosure is to provide a method of removing $H_2S$ from a subterranean geological formation with a layered triple hydroxide material in an aqueous drilling fluid suspension that may overcome the aforementioned drawbacks.

SUMMARY

In an exemplary embodiment, a method of removing hydrogen sulfide from a subterranean geological formation is described. The method includes injecting a drilling fluid suspension in the subterranean geological formation. The drilling fluid suspension includes a layered triple hydroxide material, including manganese, cobalt, and iron. The drilling fluid suspension has a pH of 10 or more, and the layered triple hydroxide material is present in an amount of 0.01 to 0.5 percent by weight of the drilling fluid suspension. The method further includes circulating the drilling fluid suspension in the subterranean geological formation and forming a water-based mud and scavenging the hydrogen sulfide from the subterranean geological formation by reacting the hydrogen sulfide with the layered triple hydroxide material in the water-based mud.

In some embodiments, a molar ratio of manganese to cobalt to iron is 1-3:0.5-2:0.5-2 in the layered triple hydroxide material.

In some embodiments, a molar ratio of manganese to cobalt to iron is 2:1:1 in the layered triple hydroxide material.

In some embodiments, the layered triple hydroxide material has a breakthrough capacity of 150 to 180 mg of hydrogen sulfide per gram of the layered triple hydroxide.

In some embodiments, the layered triple hydroxide material has a saturation capacity of 210 to 250 mg of hydrogen sulfide per gram of the layered triple hydroxide.

In some embodiments, the drilling fluid suspension further includes a bentonite, a polysaccharide, a starch, a hydroxide, and a carbonate.

In some embodiments, a breakthrough time for the hydrogen sulfide in the presence of the drilling fluid suspension is 5 to 10 times greater compared to a breakthrough time for the hydrogen sulfide in the presence of the drilling fluid suspension without the layered triple hydroxide material.

In some embodiments, a saturation time for the hydrogen sulfide in the presence of the drilling fluid suspension is 1 to 3 times greater compared to a saturation time for the hydrogen sulfide in the presence of the drilling fluid suspension without the layered triple hydroxide material.

In some embodiments, a breakthrough capacity for the hydrogen sulfide in the presence of the drilling fluid suspension is 5 to 10 times greater compared to a breakthrough capacity for the hydrogen sulfide in the presence of the drilling fluid suspension without the layered triple hydroxide material.

In some embodiments, a saturation capacity for the hydrogen sulfide in the presence of the drilling fluid suspension is 1 to 3 times greater compared to a saturation capacity for the hydrogen sulfide in the presence of the drilling fluid suspension without the layered triple hydroxide material.

In some embodiments, a plastic viscosity of the drilling fluid suspension is 0.8 to 1.2 times greater compared to a plastic viscosity of the drilling fluid suspension without the layered triple hydroxide material.

In some embodiments, an apparent viscosity of the drilling fluid suspension is 0.8 to 1.2 times greater compared to an apparent viscosity of the drilling fluid suspension without the layered triple hydroxide material.

In some embodiments, a yield point of the drilling fluid suspension is 1.1 to 1.3 times greater compared to a yield point of the drilling fluid suspension without the layered triple hydroxide material.

In some embodiments, a carrying capacity of the drilling fluid suspension is 1.1 to 1.4 times greater compared to a carrying capacity of the drilling fluid suspension without the layered triple hydroxide material.

In some embodiments, a fluid loss of the drilling fluid suspension is 0.9 to 1.2 times greater compared to a fluid loss of the drilling fluid suspension without the layered triple hydroxide material.

In some embodiments, the scavenging hydrogen sulfide converts the hydrogen sulfide into an elemental sulfur and an insoluble sulfide.

In some embodiments, a gel strength of the drilling fluid suspension at a time of 10 seconds is 0.9 to 1.3 times greater compared to a gel strength of the drilling fluid suspension without the layered triple hydroxide material at a time of 10 seconds.

In some embodiments, a gel strength of the drilling fluid suspension at a time of 10 minutes is 0.9 to 1.3 times greater compared to a gel strength of the drilling fluid suspension without the layered triple hydroxide material at a time of 10 minutes.

In another exemplary embodiment, a process of making the layered triple hydroxide material is described. The process includes dissolving a manganese salt, a cobalt salt, and an iron salt in water to form a metallic solution; dissolving a base and a carbonate salt to form an alkali solution, adding dropwise the metallic solution and the alkali solution to water, and stirring to form a first solution, stirring the first solution for 20 to 40 minutes to form a product, hydrothermally treating the product at a temperature from 120 to 180° C. for a time of 12 to 36 hours to form the layered triple hydroxide material, and drying the layered triple hydroxide material at a temperature of 60 to 100° C.

In some embodiments, the drilling fluid suspension has a density of 2 to 20 parts per gram (ppg).

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
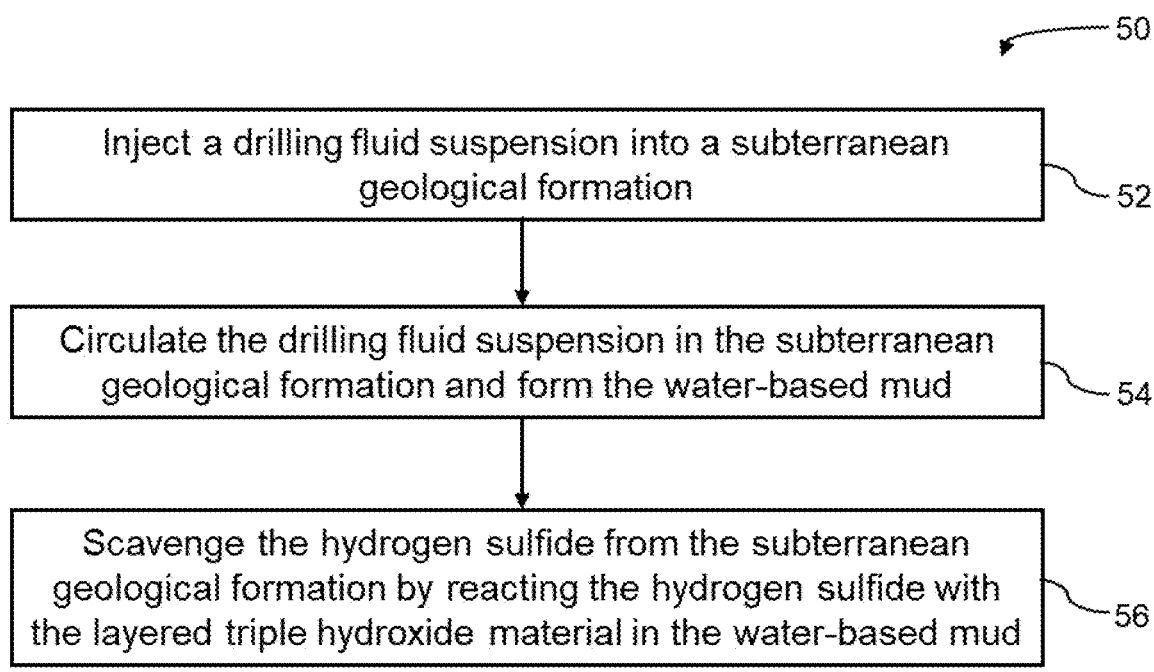
FIG. 1A is a flowchart illustrating a method of removing hydrogen sulfide ($H_2S$) from a subterranean geological formation, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a hetero-substituted hydrocarbon compound, i.e., a hydrocarbon compound which comprises an atom other than carbon in the chain or ring and the other part comprises a carbon atom. Heteroatoms may include, for example, nitrogen, oxygen, sulfur, and similar elements.

Aspects of the present disclosure are directed to a method for removing hydrogen sulfide ($H_2S$) from a subterranean geological formation using a MnCoFe-layered triple hydroxide (LTH). The MnCoFe-LTH was used in aqueous drilling fluid formulations and was evaluated for its potential to remove hydrogen sulfide ($H_2S$) in oil and gas drilling operations. The results indicate that the MnCoFe-LTH scavenger showed no detectable traces of $H_2S$ until the breakthrough time, which was approximately 296.6 minutes. The MnCoFe-LTH also demonstrated better rheological properties and improved the performance of the drilling fluid formulation, leading to smoother drilling operations.

FIG. 1A illustrates a flow chart of a method 50 for removing hydrogen sulfide from a subterranean geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure. The subterranean geological formation may include, but is not limited to, a depleted oil reservoir, a depleted gas reservoir, a sour reservoir, a hydrocarbon-bearing subterranean formation, a saline formation, an un-minable coal bed, and the like. In some embodiments, the method 50 may remove hydrogen sulfide from mixed production streams, water injection systems, produced from an oil field, and the like. Typically, the subterranean geological formation is accessed through a borehole or wellbore drilled through overlying geological strata that may isolate or seal the subterranean geological formation from the surface of the earth. The subterranean geological formation is preferably at a depth of at least 250 meters, preferably at least 500 meters, or preferably at least 1,000 meters below the surface of the earth.

At step 52, the method 50 includes injecting a drilling fluid suspension (also referred to as an aqueous drilling fluid) into the subterranean geological formation. In some embodiments, the drilling fluid is injected into the subterranean geological formation through a wellbore, e.g., through tubing connected to a supply source of the drilling fluid suspension located on the surface. In some embodiments, driving a drill bit to form a wellbore in the subterranean geological formation may lead to the production of a formation fluid. In some embodiments, the formation fluid may be a sour gas and/or a sour crude oil. Sour gas is a natural gas, including an amount of hydrogen sulfide. In some embodiments, the formation fluid may include, but are not limited to, natural gas (i.e., majority methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water, the like, and a combination thereof. Further, the non-condensable gases may include but are not limited to, hydrogen, carbon monoxide, carbon dioxide, methane, and the like. In some other embodiments, the formation fluid may be in the form of a gaseous fluid, a liquid, and/or a double-phase fluid, and the like. In some embodiments, the formation fluid includes hydrogen sulfide. Microorganisms such as sulfate-reducing bacteria may generate hydrogen sulfide in gas and oil reservoirs. In some embodiments, some other method used or known in the art may lead to the formation of hydrogen sulfide in the wellbore. The subterranean geological formation includes one or more hydrocarbons similar to the hydrocarbons present in the formation fluid.

The drilling fluid suspension includes a layered triple hydroxide (LTH) material including manganese, cobalt, and iron. Layered triple hydroxides are part of a more general group of layered hydroxides. Layered hydroxides are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. Layered hydroxides can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. Layered hydroxides may be formed with a wide variety of anions in the intercalated layers (Z), such as dodecyl sulfate (DDS) ($CH_3(CH_2)_{11}OSO_3^-$), $Cl^-$, $Br^-$, nitrate ($NO_3^-$), carbonate ($CO_3^{2-}$), $SO_4^{2-}$, acetate ($C_2H_3O_2^-$), $SeO_4^{2-}$, and combinations thereof. The size and properties of the intercalated anions may have an effect on the spacing of the layers, known as the basal spacing.

A layered hydroxide may be a synthetic or a naturally occurring layered hydroxide. Naturally-occurring layered hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered hydroxide, such as coalingite, brugnatellite, or muskoxite.

In preferred embodiments, the layered hydroxide has a positive layer (c) which contains both divalent and trivalent cations. In an embodiment, the divalent ion is at least one selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and $Zn^{2+}$. In an embodiment, the trivalent ion is at least one selected from the group consisting of $M^{3+}$ is $Al^{3+}$, $Mn^{3+}$, $Cr^{3+}$, $Fe^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In a preferred embodiment, the layered triple hydroxide (LTH) contains two divalent cations and one trivalent cation and has a layer structure. In a most preferred embodiment, the LTH is a MnCoFe-LTH.

In some embodiments, a molar ratio of manganese to cobalt to iron is 1-3:0.5-2:0.5-2, preferably 1.2-2.8:0.6-1.8:0.6-1.8, preferably 1.4-2.6:0.7-1.6:0.7-1.6, preferably 1.6-2.4:0.8-1.4:0.8-1.4, more preferably 1.8-2.2:0.9-1.2:0.9-1.2, and yet more preferably about 2:1:1, in the layered triple hydroxide material. In some embodiments, a molar ratio of manganese to cobalt to iron is 2:1:1 in the layered triple hydroxide material.

In an embodiment, the layered hydroxide component may have a particulate form, for example in the form of spheres, granules, whiskers, sheets, flakes, plates, foils, fibers, and the like. In some embodiments, the layered hydroxide includes particles having an average size of 10-70 nm, or preferably 15-65 nm, preferably 20-60 nm, preferably 25-55 nm, preferably 30-50 nm, preferably 35-45 nm. In some embodiments, the layered hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. In an embodiment, the layered hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm. In an embodiment, the layered hydroxide has a basal spacing of 0.5 to 10 nm, preferably 1 to 9 nm, 2 to 8 nm, 3 to 7 nm, 4 to 6 nm, or 4.5 to 5.5 nm.

In some embodiments, the drilling fluid suspension further includes a bentonite, a polysaccharide, a starch, a hydroxide, and a carbonate. The "bentonite" may refer to potassium bentonite, sodium bentonite, calcium bentonite, aluminum bentonite, and combinations thereof, depending on the relative amounts of potassium, sodium, calcium, and aluminum in the bentonite. The bentonite acts as a viscosifier. The viscosifier is an additive of the drilling fluid suspension that increases the viscosity of the drilling fluid suspension. In some embodiments, the bentonite may be substituted by other viscosifiers that may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, and the like. In some embodiments, the viscosifier may further include a natural polymer such as a hydroxyethyl cellulose (HEC) polymer, a carboxymethylcellulose (CMC) polymer, a polyanionic cellulose (PAC) polymer, and the like, or a synthetic polymer such as poly(diallyl amine), diallyl ketone, diallyl amine, styryl sulfonate, vinyl lactam, laponite, polygorskites (such as attapulgite, sepiolite, and the like), a drilling polymer, a resonated polymer, a polyacrylate polymer, the like, and combinations thereof. A viscosifier may be used to increase a carrying capacity of the drilling fluid suspension.

The polysaccharide and starch act as a fluid loss prevention agent. The fluid loss prevention agent is an additive of the drilling fluid suspension that controls loss of the drilling fluid suspension when injected into the subterranean geological formation. In some embodiments, the drilling fluid suspension may include multiple fluid loss prevention agents depending on the customized need of a user. In some embodiments, the other fluid loss prevention agents, such as silica flour, gas bubbles (energized fluid or foam), benzoic acid, soaps, resin particulates, relative permeability modifiers, degradable gel particulates, hydrocarbons dispersed in fluid, one or more immiscible fluids, the like, and a combination thereof may be used as well. In some embodiments, the polysaccharide is a xanthan gum. In some embodiments, the starch is a corn starch.

The hydroxide acts as a pH-adjusting agent, also referred to as the buffer. The pH-adjusting agent may include an alkali metal base. In some embodiments, the alkali metal base may include, but is not limited to, potassium hydroxide, lithium hydroxide, rubidium hydroxide, cesium hydroxide, and sodium hydroxide. In a preferred embodiment, the hydroxide is potassium hydroxide. In some embodiments, the pH adjusting agent may include, but is not limited to, monosodium phosphate, disodium phosphate, sodium tripolyphosphate, and the like. In some embodiments, the pH of the drilling fluid suspension is acidic or neutral. In a preferred embodiment, the pH of the drilling fluid suspension is basic, with pH ranging from 7 to 14, preferably 8 to 13, more preferably 9 to 12, and yet more preferably a pH of at least 10. The drilling fluid suspension has a pH of 10 or more. In some embodiments, the carbonate acts as a pH treatment source. In a preferred embodiment, the carbonate is a calcium carbonate.

In some embodiments, the drilling fluid suspension further includes a barite as a weighting agent. The weighting agent is an agent that increases the overall density of the drilling fluid suspension to provide sufficient bottom-hole pressure to prevent an unwanted influx of formation fluids. The density of the drilling fluid suspension includes all practical ranges and is not limited to 9 pounds-per-gallon (ppg). In some embodiments, the weighting agent may include, but is not limited to, calcium carbonate, sodium sulfate, hematite, siderite, ilmenite, the like, and a combination thereof.

In some embodiments, the drilling fluid suspension may also include a deflocculant. Deflocculant is an additive of the drilling fluid suspension that prevents a colloid from coming out of suspension or slurries. In some embodiments, the deflocculant may include, but is not limited to, an anionic polyelectrolyte, for example, acrylates, polyphosphates, lignosulfonates (LS), and/or tannic acid derivatives, for example, quebracho, the like, and a combination thereof.

In some embodiments, the drilling fluid suspension may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC), the like, and a combination thereof.

In some embodiments, the drilling fluid suspension may also include a crosslinker. The crosslinker is an additive of the drilling fluid suspension that can react with multiple-strand polymers to couple molecules together, thereby creating a highly viscous fluid, with a controllable viscosity. The crosslinker may include, but is not limited to, metallic salts, such as salts of aluminum, iron, boron, titanium, chromium, zirconium, and/or organic crosslinkers, such as polyethylene amides, formaldehyde, the like, and a combination thereof.

In some embodiments, the drilling fluid suspension may also include a breaker. The breaker is an additive of the drilling fluid suspension that provides a desired viscosity reduction in a specified period. The breaker may include, but is not limited to, oxidizing agents, such as sodium chlorites, sodium bromate, hypochlorites, perborate, persulfates, peroxides, enzymes, the like, and a combination thereof.

In some embodiments, the drilling fluid suspension may include a biocide. The biocide is an additive of the drilling fluid suspension that may kill microorganisms present in the drilling fluid suspension. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, 2-bromo-2-nitro-1,3-propanedial, the like, and a combination thereof.

The drilling fluid suspension may also include a corrosion inhibiting agent. The corrosion inhibiting agent is a chemical compound that decreases the corrosion rate of a material, more preferably, a metal or an alloy, that meets the drilling fluid suspension. In some embodiments, the corrosion inhibiting agent may include, but is not limited to, imidazolines and amido amines. In some embodiments, the corrosion inhibiting agent may include, but is not limited to, oxides, sulfides, halides, nitrates, preferably halides, of metallic elements of group IIIa to VIa, such as $SbBr_3$, the like, and a combination thereof.

The drilling fluid suspension may also include an anti-scaling agent. The anti-scaling agent is an additive of the drilling fluid suspension that inhibits the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), polymers of sulfonic acid on a polycarboxylic acid backbone, and the like. In some embodiments, the anti-scaling agent may further include phosphine, sodium hexametaphosphate, sodium tripolyphosphate, other inorganic polyphosphates, hydroxy ethylidene diphosphonic acid, butane-tricarboxylic acid, phosphonates, itaconic acid, and 3-allyloxy-2-hydroxy-propionic acid, the like, and a combination thereof. In some embodiments, the drilling fluid suspension may include metal sulfide scale removal agents, such as hydrochloric acid and the like.

In some embodiments, the drilling fluid suspension includes a gelling agent such as gum Arabic. Certain other examples of gelling agents include, but are not limited to, copolymers, more preferably poly(vinyl butyral-co-vinyl alcohol-co-vinyl acetate).

The drilling fluid suspension may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), ethylenediaminetetraacetic acid (EDTA), the like, and a combination thereof. The concentration of components of the drilling fluid suspension may be varied to impart desired characteristics of the drilling fluid suspension.

At step 54, the method 50 includes circulating the drilling fluid suspension in the subterranean geological formation and forming a water-based mud. The drilling fluid suspension is mixed with the MnCoFe-LTH, prior to circulating the subterranean geological formation for at least 30 minutes, preferably for an hour, to form the water-based mud. Once the drilling fluid suspension is injected into the subterranean geological formation, it mixes with the sub-surface fluid and circulates in the subterranean geological formation to form the water-based mud (WBM). In some embodiments a major portion, preferably at least 80 vol %, at least 90 vol % or at least 95 vol %, of the drilling fluid suspension injected into the subterranean geological formation remains in the borehole and is circulated only in the borehole without directly entering pores or cracks present in the subterranean geological formation. In some embodiments, the MnCoFe-LTH has a pH of 10 or more and is present in an amount of 0.01 to 0.5 percent by weight (wt. %), preferably 0.05 to 0.45 wt. %, preferably 0.1 to 0.4 wt. %, more preferably 0.2 to 0.3 wt. %, and yet more preferably about 0.25 wt. % of the drilling fluid suspension. In some embodiments, the amount of the MnCoFe-LTH may be adjusted according to the hydrogen sulfide amount that may be encountered during the wellbore drilling. The purpose of injecting and circulating the MnCoFe-LTH is to: i) prevent corrosion of metallic drilling equipment exposed to hydrogen sulfide during oil and gas drilling operations due to the $H_2S$; ii) to remove the $H_2S$ encountered during the drilling operation; and iii) and to prevent unwanted effects of $H_2S$ in the drilling fluid suspension caused by exposure or contamination by $H_2S$. In one embodiment, the method 50 is to enhance the rheological properties of any drilling fluid, not limited to the drilling fluid suspension of the present disclosure, whereby the MnCoFe-LTH is utilized.

At step 56, the method 50 includes scavenging the hydrogen sulfide from the subterranean geological formation by reacting the hydrogen sulfide with the layered triple hydroxide material in the water-based mud. Upon scavenging, the hydrogen sulfide is converted to elemental sulfur and an insoluble sulfide.

As used herein, the term "breakthrough time" refers to the elapsed time between initial contact of the composite mixture with the $H_2S$-containing gas composition and the time at which $H_2S$ is detected in the purified gas composition. In some embodiments, a breakthrough time for the hydrogen sulfide in the presence of the drilling fluid suspension is 5 to 10 times greater, preferably 6 to 9 times greater, more preferably 7 to 9 times greater, and yet more preferably about 8.6 times greater compared to a breakthrough time for the hydrogen sulfide in the presence of the drilling fluid suspension without the layered triple hydroxide material.

As used herein, the term "saturation time" refers to the time during which the adsorbent is saturated (in equilibrium) with the adsorbate. In some embodiments, "saturation time" refers to the time it took the outlet $H_2S$ concentration to reach 99 to 105 parts per million volume (ppmv), preferably 100 to 104 ppm. In some embodiments, a saturation time for the hydrogen sulfide in the presence of the drilling fluid suspension is 1 to 3 times greater, preferably 1.5 to 2.5 times greater, more preferably 1.8 to 2.2 times greater, and yet more preferably about 1.96 times greater compared to a saturation time for the hydrogen sulfide in the presence of the drilling fluid suspension without the layered triple hydroxide material.

As used herein, the term "breakthrough capacity" refers to the amount of $H_2S$ adsorbed by the material during the breakthrough period. In some embodiments, a breakthrough capacity for the hydrogen sulfide in the presence of the drilling fluid suspension is 5 to 10 times greater, preferably 6 to 9 times greater, more preferably 7 to 9 times greater, and yet more preferably about 8.5 times greater compared to a breakthrough capacity for the hydrogen sulfide in the presence of the drilling fluid suspension without the layered triple hydroxide material. In some embodiments, the layered triple hydroxide material has a breakthrough capacity of 150 to 180 mg of hydrogen sulfide per gram of the layered triple hydroxide (mg/g), preferably 151 to 179 mg/g, preferably 152 to 178 mg/g, preferably 153 to 177 mg/g, preferably 154 to 176 mg/g, preferably 155 to 175 mg/g, preferably 156 to 174 mg/g, preferably 157 to 173 mg/g, preferably 158 to 172 mg/g, preferably 159 to 171 mg/g, preferably 160 to 170 mg/g, preferably 161 to 169 mg/g, preferably 162 to 168 mg/g, more preferably 163 to 167 mg/g, and yet more preferably 164 to 166 mg/g. In a preferred embodiment, the layered triple hydroxide material has a breakthrough capacity of about 165 mg of hydrogen sulfide per gram of the layered triple hydroxide.

As used herein, the term "saturation capacity" refers to the amount of $H_2S$ adsorbed by the material during the saturation period. In some embodiments, a saturation capacity for the hydrogen sulfide in the presence of the drilling fluid suspension is 1 to 3 times greater, preferably 1.5 to 2.5 times greater, more preferably 1.8 to 2.2 times greater, and yet more preferably about 2.1 times greater compared to a saturation capacity for the hydrogen sulfide in the presence of the drilling fluid suspension without the layered triple hydroxide material. In some embodiments, the layered triple hydroxide material has a saturation capacity of 210 to 250 mg of hydrogen sulfide per gram of the layered triple hydroxide (mg/g), preferably 212 to 248 mg/g, preferably 214 to 246 mg/g, preferably 216 to 244 mg/g, preferably 218 to 242 mg/g, preferably 220 to 240 mg/g, preferably 222 to 238 mg/g, preferably 224 to 236 mg/g, preferably 226 to 234 mg/g, more preferably 228 to 232 mg/g, and yet more preferably 229 to 230 mg/g. In a preferred embodiment, the layered triple hydroxide material has a saturation capacity of about 229.4 mg of hydrogen sulfide per gram of the layered triple hydroxide.

As used herein, the term "plastic viscosity" refers to the difference between the dial readings from a viscometer recorded at 600 rpm and 300 rpm. In some embodiments, the plastic viscosity of the drilling fluid suspension is 0.8 to 1.2 times greater, preferably 0.9 to 1.1 times greater, and more preferably about 0.96 times greater compared to the plastic viscosity of the drilling fluid suspension without the layered triple hydroxide material.

As used herein, the term "apparent viscosity" refers to the Bingham model where the value is one-half of the dial reading from a viscometer at 600 rpm of shear stress [Onaizi, S. A., Gawish, M. A., Murtaza, M., Gomaa, I., Tariq, Z., Mahmoud, M., $H_2S$ scavenging capacity and rheological properties of water-based drilling muds, ACS Omega, 2020, 5, 30729-30739, which in incorporated herein by reference in its entirety]. In some embodiments, an apparent viscosity of the drilling fluid suspension is 0.8 to 1.2 times greater, preferably 0.9 to 1.1 times greater compared to an apparent viscosity of the drilling fluid suspension without the layered triple hydroxide material. In some embodiments, the apparent viscosity of the drilling fluid suspension is the same as the apparent viscosity of the drilling fluid suspension without the layered triple hydroxide material.

In some embodiments, a yield point of the drilling fluid suspension is 1.1 to 1.3 times greater, preferably 1.15 to 1.25 times greater, and more preferably about 1.2 times greater compared to a yield point of the drilling fluid suspension without the layered triple hydroxide material.

In some embodiments, the carrying capacity of the drilling fluid suspension is 1.1 to 1.4 times greater, preferably 1.2 to 1.3 times greater, and more preferably about 1.24 times greater compared to the carrying capacity of the drilling fluid suspension without the layered triple hydroxide material.

In some embodiments, a fluid loss of the drilling fluid suspension is 0.9 to 1.2 times greater, preferably 1 to 1.1 times greater, more preferably 1.02 to 1.08 times greater, and yet more preferably about 1.06 times greater compared to a fluid loss of the drilling fluid suspension without the layered triple hydroxide material. In some embodiments, the gel strength of the drilling fluid suspension at a time of 10 seconds is 0.9 to 1.3 times greater, preferably 0.95 to 1.25 times greater, preferably 1 to 1.2 times greater, preferably 1.05 to 1.15 times greater, more preferably 1.08 to 1.13 times greater, and yet more preferably about 1.11 times greater compared to a gel strength of the drilling fluid suspension without the layered triple hydroxide material at a time of 10 seconds. In some embodiments, the gel strength of the drilling fluid suspension at a time of 10 minutes is 0.9 to 1.3 times greater, preferably 0.95 to 1.25 times greater, more preferably 1.0 to 1.2 times greater, and yet more preferably about 1.07 times greater compared to a gel strength of the drilling fluid suspension without the layered triple hydroxide material at a time of 10 minutes. In some embodiments, the drilling fluid suspension has a density of 2 to 20 parts per gram (ppg), preferably 4 to 18 ppg, preferably 6 to 16 ppg, preferably 7 to 15 ppg, preferably 8 to 12 ppg, more preferably 9 to 11 ppg, and yet more preferably about 10 ppg.

Figure 1B:
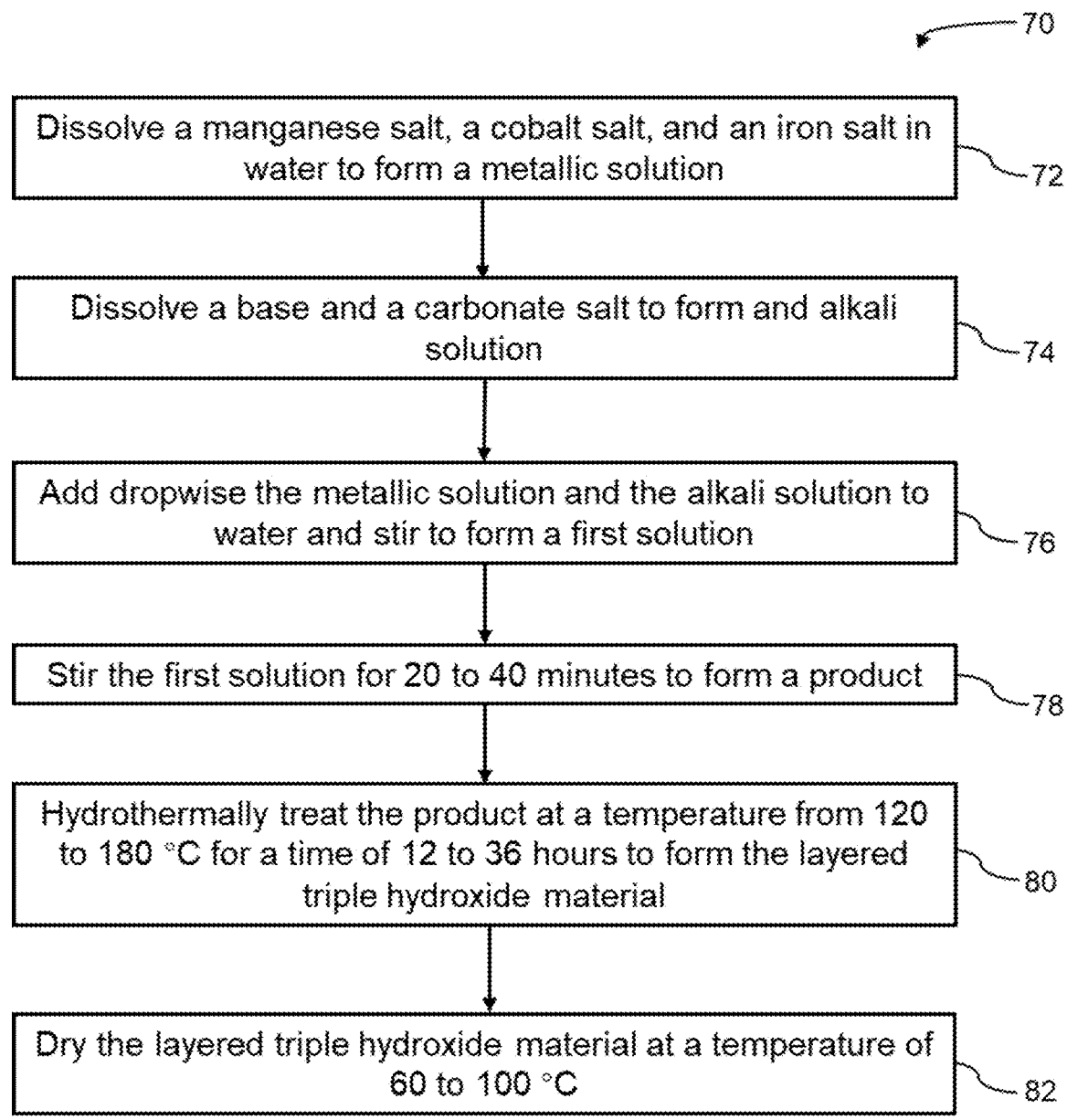
FIG. 1B is a flowchart illustrating a method of making a layered triple hydroxide material, according to certain embodiments.

FIG. 1B illustrates a flow chart of a method 70 of making the layered triple hydroxide material. The layered triple hydroxide material can be synthesized by any other method of synthesis, including but not limited to coprecipitation, hydrothermal methods, solvothermal methods, or sol-gel methods. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes dissolving a manganese salt, a cobalt salt, and an iron salt in water to form a metallic solution. In some embodiments, the manganese salt may include, but is not limited to, manganese sulfate, manganese hydroxide, manganese nitrate, manganese acetate, manganese fluoride, manganese bromide, manganese carbonate, manganese chloride, manganese chlorate, manganese tetroxide, manganese dioxide, manganese permanganate, manganese gluconate, manganese oxide, and the like, and a combination thereof. In some embodiments, the manganese salt may be a manganese hydrate salt. In some embodiments, the manganese salt is $Mn(NO_3)_2 \cdot 6H_2O$. In some embodiments, the cobalt salt may include, but are not limited to, cobalt sulfate, cobalt chloride, cobalt hydroxide, cobalt nitrate, cobalt oxide, cobalt acetate, cobalt fluoride, cobalt bromide, cobalt carbonate, cobalt carbonate hydroxide, cobalt chlorate, cobalt arsenate, cobalt azide, cobalt acetylacetonate, cobalt aspirinate, cobalt cyanurate, cobalt glycinate, cobalt phosphate, cobalt perchlorate, cobalt selenite, cobalt sulfide, cobalt triflate, cobalt thiocyanate, cobalt tetrafluoroborate, cobalt acetate triarsenite, cobalt benzoate, cobalt arsenite, cobalt chromite, cobalt gluconate, cobalt peroxide, cobalt usnate, cobalt oxychloride, and the like, and a combination thereof. In some embodiments, the cobalt salt may be a cobalt hydrate salt. In some embodiments, the cobalt salt is $Co(NO_3)_2 \cdot 6H_2O$. Suitable examples of iron salts include iron acetate, iron bromide, iron carbonate, iron chloride, iron chromite, iron citrate, iron cyanide, iron fluoride, iron fumarate, iron gluconate, iron hydride, iron hydroxide, iron iodide, iron lactate, iron molybdate, iron nitrate, iron oxalate, iron oxide, and the like, and a combination thereof. In some embodiments, the iron salt may be an iron hydrate salt. In some embodiments, iron salt is $Fe(NO_3)_3 \cdot 9H_2O$. In some embodiments, the water is selected from the group consisting of tap water, ground water, distilled water, deionized water, saltwater, hard water, fresh water, and wastewater. For purposes of this description, the term "saltwater" may include saltwater with a chloride ion content of between about 6000 ppm and saturation. The term "saltwater" is intended to encompass seawater and other types of saltwater including groundwater containing additional impurities typically found therein such as brackish water. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in tap water, ground water, saltwater, wastewater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In a preferred embodiment, the water is distilled water.

In some embodiments, the molar ratio of the iron salt to the cobalt salt is in the range of 5:1 to 1:5, preferably 4:1 to 1:4, preferably 3:1 to 1:3, more preferably 2:1 to 1:2, and yet more preferably about 1:1. In some embodiments, the molar ratio of the manganese salt to the cobalt salt is in the range of 5:1 to 1:5, preferably 4:1 to 1:4, preferably 3:1 to 1:3, more preferably 2:1 to 1:2, and yet more preferably about 2:1. In some embodiments, the molar ratio of the manganese salt to the iron salt is in the range of 5:1 to 1:5, preferably 4:1 to 1:4, preferably 3:1 to 1:3, more preferably 2:1 to 1:2, and yet more preferably about 2:1.

At step 72, the method 70 includes dissolving a base and a carbonate salt to form an alkali solution. The base may be selected from the group consisting of an alkaline earth metal hydroxide, such as beryllium hydroxide $(Be(OH)_2)$, magnesium hydroxide $(Mg(OH)_2)$, strontium hydroxide $(Sr(OH)_2)$, and calcium hydroxide $(Ca(OH)_2)$, and an alkali metal hydroxide such as lithium hydroxide (LiOH), sodium hydroxide (NaOH), potassium hydroxide (KOH), and rubidium hydroxide (RbOH), and cesium hydroxide (CsOH). In some embodiments, the inorganic base is at least one of potassium carbonate and sodium carbonate. In a preferred embodiment, the base is NaOH. Examples of carbonate include, but are not limited to, ammonium bicarbonate, barium carbonate, calcium carbonate, magnesite, sodium percarbonates, sodium carbonate, sodium bicarbonate, and the like.

At step 76, the method 70 includes adding dropwise the metallic solution and the alkali solution to water and stirring to form a first solution. In some embodiments, the pH of the first solution is between 9 and 11, preferably about 10. In some embodiments, addition can be done by any method used or known in the art.

At step 78, the method 70 includes stirring the first solution for 20 to 40 minutes, preferably 25 to 35 minutes, more preferably 28 to 32 minutes, and yet more preferably about 30 minutes to form a product. In some embodiments, other modes of stirring known to those of ordinary skill in the art, for example, via swirling, mixing, centrifuging, and/or a combination thereof, may be employed.

At step 80, the method 70 includes hydrothermally treating the product at a temperature from 120 to 180° C., preferably 125 to 175° C., preferably 130 to 170° C., preferably 135 to 165° C., preferably 140 to 160° C., more preferably 145 to 155° C., and yet more preferably about 150° C. for 20 to 30 hours, preferably 21 to 28 hours, preferably 22 to 26 hours, more preferably 23 to 25 hours, and yet more preferably about 24 hours to form the layered triple hydroxide material.

At step 82, the method 70 includes drying the layered triple hydroxide material at a temperature of 60 to 100° C., preferably 70 to 90° C., more preferably 75 to 85° C., and yet more preferably about 80° C. In some embodiments, the drying can be performed by using heating appliances such as ovens, microwaves, autoclaves, hot plates, heating mantles and tapes, oil baths, salt baths, sand baths, air baths, hot-tube furnaces, hot-air guns, and the like.

In the present disclosure the method 50 for removing hydrogen sulfide from aqueous drilling fluids during oil/gas wells drilling is disclosed. The method 50 also prevents metallic corrosion that results from exposure to $H_2S$. The method provides an effective means of removing hydrogen sulfide from water-based drilling fluids while maintaining the integrity of metallic structures during subterranean drilling operations. In some embodiments, the layered triple hydroxide material is utilized for $H_2S$ removal in aqueous systems other than water-drilling mud, which includes but is not limited to the removal of $H_2S$ from water injection systems, produced water from an oilfield, and hydrogen sulfide present in mixed production streams. The layered triple hydroxide material is insoluble, and chemically and thermally stable under aqueous systems. The method 50 and the layered triple hydroxide material may also be used to remove hydrogen sulfide from gaseous streams containing hydrogen sulfide.

EXAMPLES

The following examples demonstrate a method of removing hydrogen sulfide ($H_2S$) from a subterranean geological formation. The examples are provided solely for illustration and are not to be construed as limitations of the present disclosure, as many variations thereof are possible without departing from the spirit and scope of the present disclosure.

Example 1: Synthesis of MnCoFe-LTH

The MnCoFe-LTH was synthesized by co-precipitation followed by hydrothermal treatment at 150 degrees Celsius (° C.). A 150 milliliter (mL) metallic solution containing 22.11 millimoles (mmol) $Mn(NO_3)_2 \cdot 6H_2O$, 11.06 mmol $Co(NO_3)_2 \cdot 6H_2O$, and 11.06 mmol $Fe(NO_3)_3 \cdot 9H_2O$ was prepared in a volumetric flask. In a second volumetric flask, a 150 mL alkali solution containing 88.46 mmol NaOH and 5.53 mmol of $Na_2CO_3$, was prepared. The molar ratios of $Mn^{2+}/Co^{2+}$ and $(Mn^{2+}+Co^{2+})/Fe^{3+}$ were maintained at 2/1 and 3/1, respectively. The two solutions were added dropwise simultaneously into a beaker containing 100 mL distilled water, initially at a pH of 10, while continuously stirring with the aid of a magnetic stirrer. The pH of the mixture in the beaker was maintained between pH 9.5-11 during the addition of the metal and alkali solutions. After the complete addition of the above solutions, the reaction mixture was left to stir at room temperature for 30 minutes (min) to aid in the formation of the triple hydroxide layers. The resulting product was transferred into an autoclave reactor for hydrothermal treatment at 150° C. for 24 hours (h). Finally, the MnCoFe-LTH was centrifuged and dried in an oven at 80° C.

Figure 2:
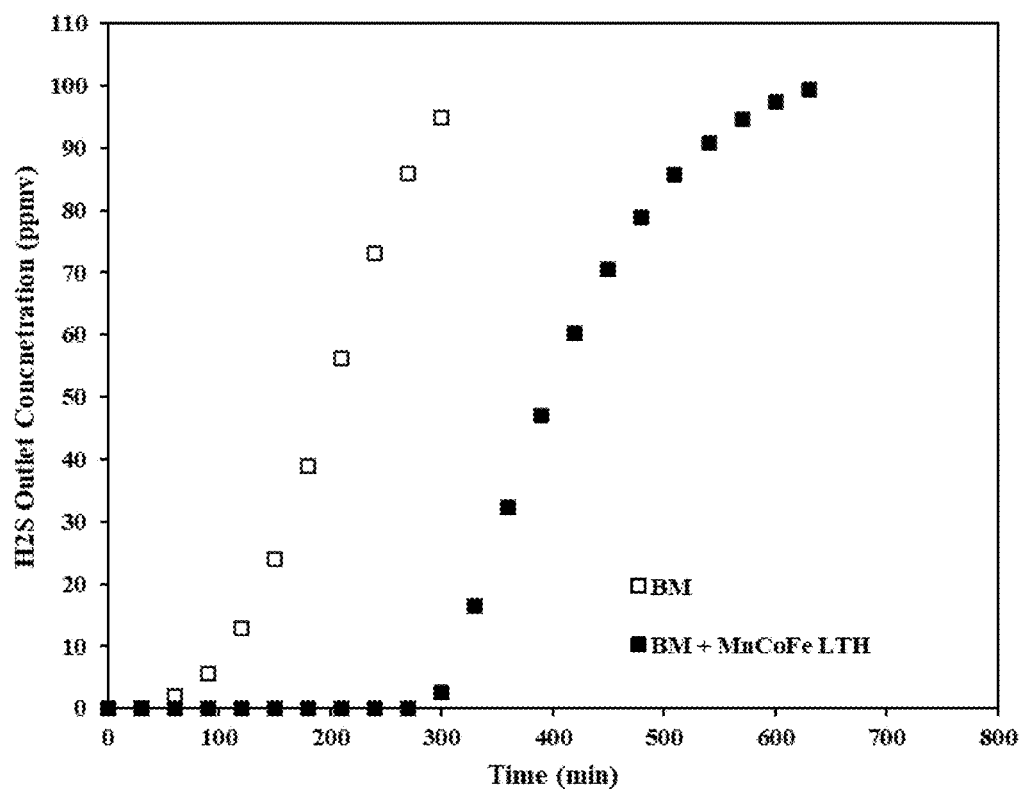
FIG. 2 is a graph depicting $H_2S$ scavenging capacity of a drilling fluid suspension of the present disclosure as a function of time, according to certain embodiments.
Figure 3:
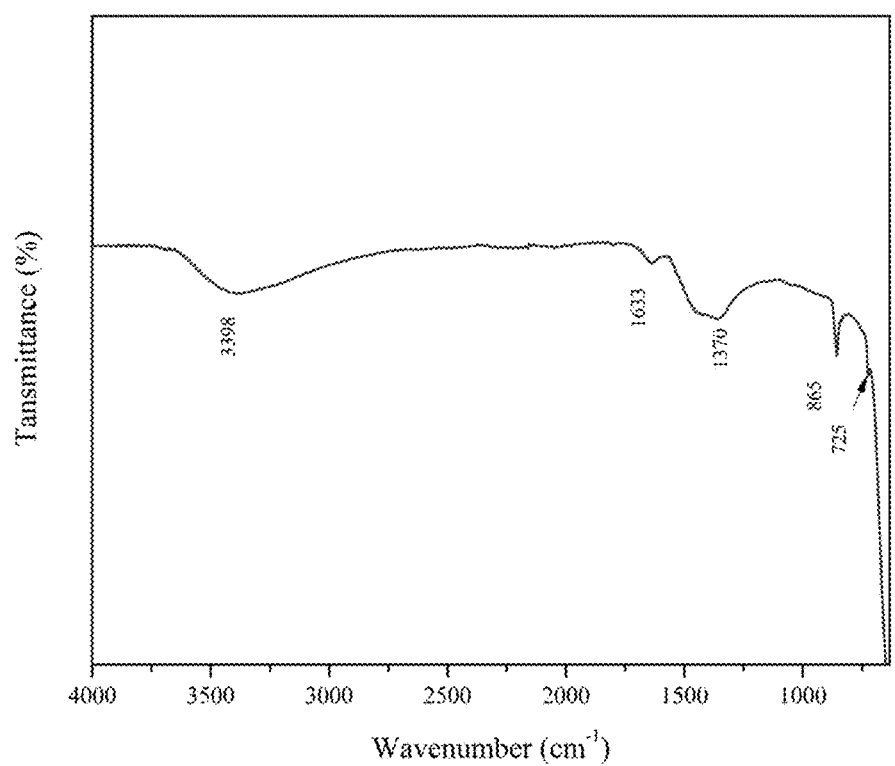
FIG. 3 depicts a Fourier-transform infrared (FTIR) spectrum of a MnCoFe-triple layered hydroxide (LTH) scavenger, according to certain embodiments.
Figure 4:
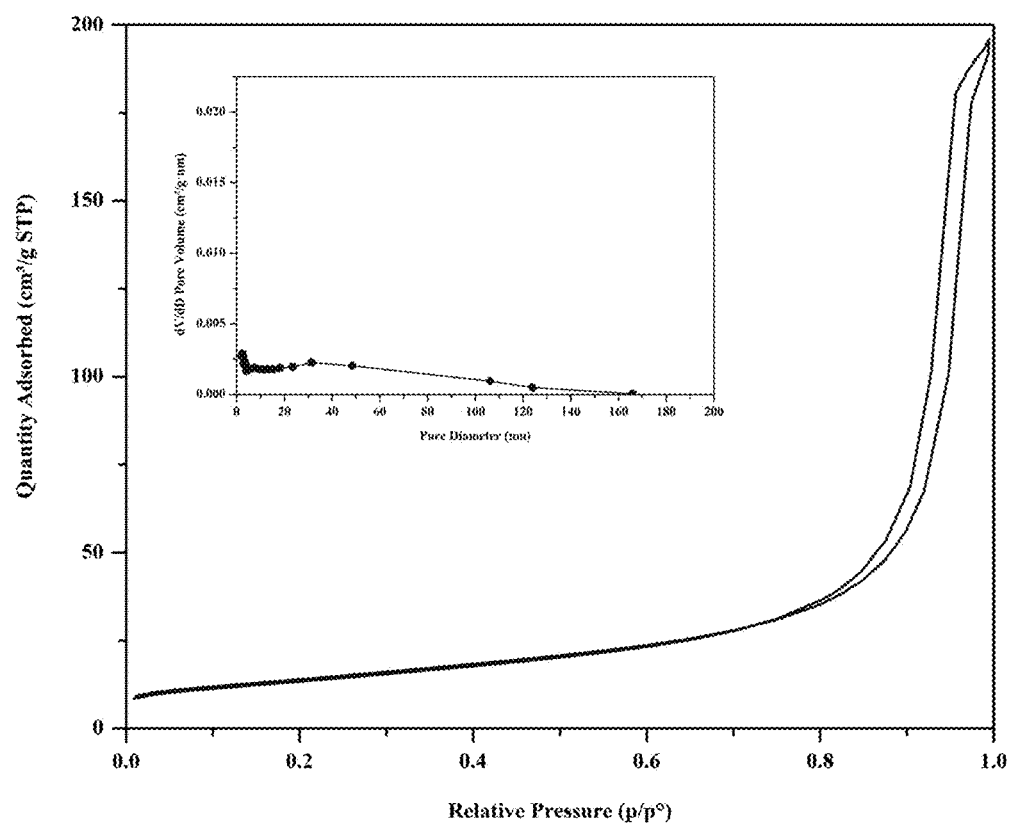
FIG. 4 depicts nitrogen ($N_2$) adsorption/desorption isotherms of the MnCoFe-LTH scavenger, according to certain embodiments.
Figure 5:
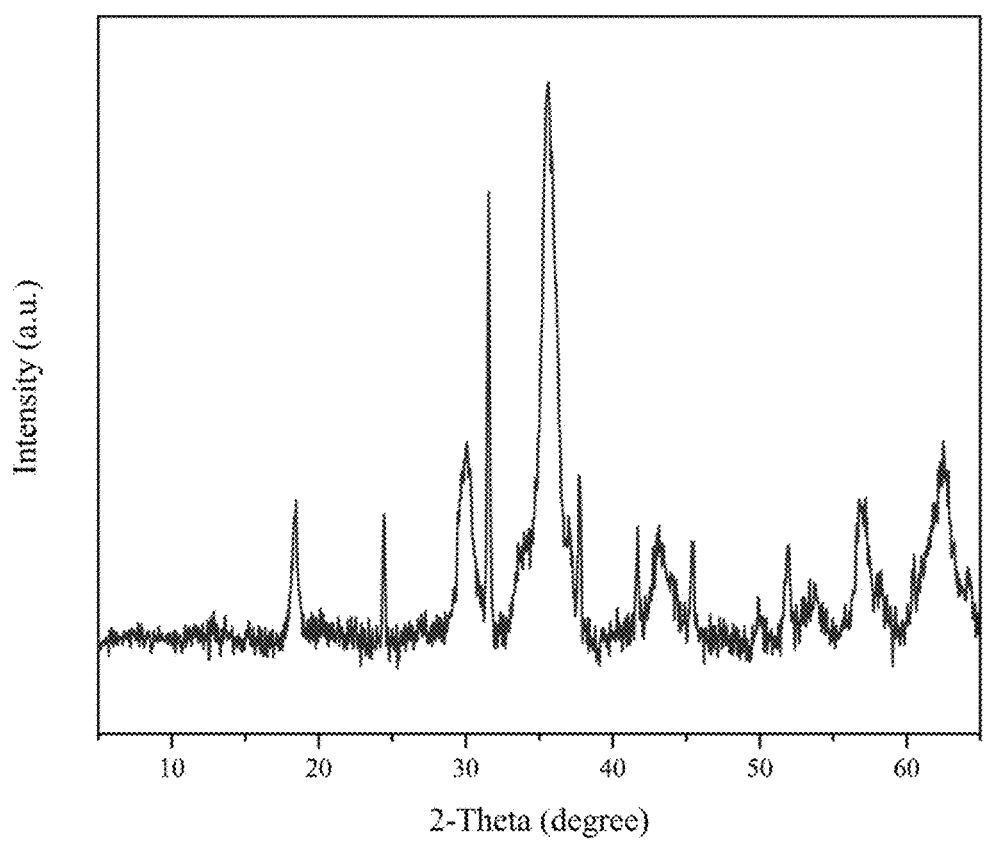
FIG. 5 depicts an X-ray diffraction (XRD) pattern of the MnCoFe-LTH scavenger, according to certain embodiments.
Figure 6:
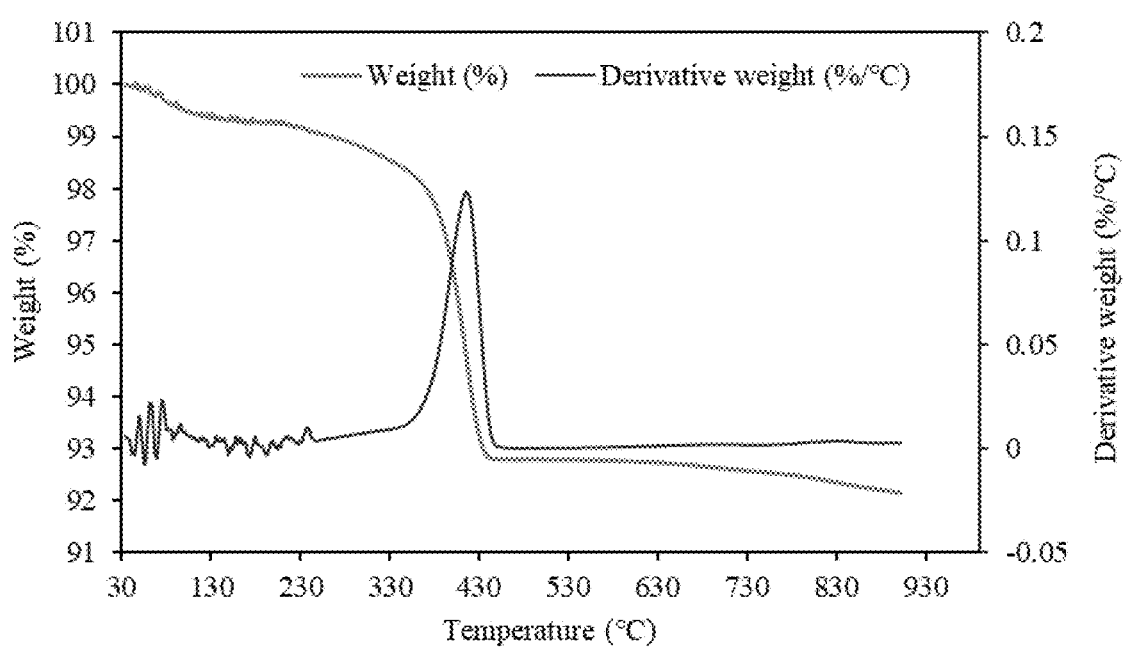
FIG. 6 is a graph depicting thermal stability of the MnCoFe-LTH scavenger measured using thermogravimetric analysis (TGA), according to certain embodiments.

Example 2: Ability of the Scavenger to Remove $H_2S$ During Oil/Gas Well Drilling In a continuous setup with a bubble column, flowmeter, and $H_2S$ detector, the scavenging capacities at breakthrough (i.e., when $H_2S$ was first detected in the outlet gas stream) and at saturation of the aqueous drilling fluid without the scavenger and aqueous drilling fluid with the added scavenger were determined. The 9.0 ppg water-based drilling mud was formulated according to Table 1 and the pH was adjusted between 11-11.50. Each component is chosen purposely for their intrinsic properties and advantages to the rheology of the aqueous drilling fluid. The scavenger-based drilling mud was formulated with the addition of 0.25 wt. % of MnCoFe-LTH, alternatively referred to as "LTH-BM" without any limitations. 10.0 g of the formulated drilling fluid was collected into the bubble column for $H_2S$ scavenging capacity measurement. A steady continuous gaseous source of 100 ppmv $H_2S$ (in methane) flowing at 100 mL/min was utilized for the above-mentioned tests and the result are illustrated in FIG. 2.

TABLE 1

| Additives | Quantities |
| --- | --- |
| Distilled Water | 350.0 mL |
| Bentonite | 20.0 g |
| Xanthan Gum | 0.2 g |
| Starch | 6.0 g |
| Potassium Hydroxide | 0.5 g |
| Calcium Carbonate | 30.0 g |

Example 3: Effect of the Layered Triple Hydroxide Nanomaterial on Rheological Characteristics of Drilling Fluids The rheological characteristics of aqueous drilling fluids at varying concentrations were examined. The rheological measurements were conducted using a Model 3600 Grace viscometer (Grace Instruments, Texas, USA), at a temperature of 120° F. and ambient pressure. The results of the test revealed that the utilization of the presented scavenger does not have any deleterious impacts on the rheological properties of the water-based mud. Notably, the results indicate that the scavengers may be employed to enhance the apparent viscosity (AV), yield point (YP), and gel strengths (GS) of the aqueous drilling fluids. The results of these tests are presented in Table 2 and Table 3. The $H_2S$ scavenging performance of the LTH-BM benchmarked against the base mud without any scavenger is presented in Table 4.

TABLE 2

| | Rheological parameters | | | | | |
| --- | --- | --- | --- | --- | --- | --- |
| Scavenger conc. (wt. %) | PV (cP) | YP (lb/100 ft$^2$) | AV (cP) | Carrying capacity YP/PV | GS (10 s) (lb/100 ft$^2$) | GS (10 min) (lb/100 ft$^2$) |
| BM | 19.08 | 7.05 | 15.56 | 0.45 | 3.52 | 18.19 |
| LTH-BM | 19.18 | 8.41 | 14.97 | 0.56 | 3.91 | 19.56 |

TABLE 3

| Drilling fluid | Fluid loss (mL) | FL Cake Thickness (mm) |
| --- | --- | --- |
| BM | 12.8 | 2.38 |
| LTH-BM | 13.6 | 2.38 |

TABLE 4

| Drilling fluid | Breakthrough time (min) | Breakthrough capacity | Saturation time (min) | Saturation capacity |
| --- | --- | --- | --- | --- |
| BM | 34.5 | 52.3 mg/L | 325 | 294.6 mg/L |
| LTH-BM | 296.6 | 443.4 mg/L<br>165.0 mg/g | 638 | 616.4 mg/L<br>229.4 mg/g |

Aspects of the present disclosure provide a method for scavenging $H_2S$ from a subterranean geological formation. The present disclosure provides a specifically engineered scavenger to effectively scavenge $H_2S$ in oil and gas drilling operations. The proposed scavenger, MnCoFe-LTH, as described in the present disclosure, is a layered triple hydroxide nanomaterial designed for the purpose of $H_2S$ removal. To assess its performance, the $H_2S$ scavenging capacity of MnCoFe-LTH was evaluated in a water-based drilling fluid using a bubble column system, with a continuous flow of 100 ppmv $H_2S$ at a rate of 100 mL/min. Notably, no traces of $H_2S$ were detected until the breakthrough time of approximately 296.6 minutes during the scavenging test, showcasing the effectiveness of MnCoFe-LTH as a scavenger compared to the aqueous drilling fluid without any MnCoFe-LTH scavenger, which had a shorter breakthrough time of 34.5 minutes. In addition to the $H_2S$ scavenging capabilities of the proposed scavenger, the MnCoFe-LTH also demonstrated the ability to enhance the rheological properties of the drilling fluid formulation. The proposed scavenger may improve the overall performance of the drilling fluid, contributing to efficient drilling operations.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of removing hydrogen sulfide from a wellbore in a subterranean geological formation, comprising:
injecting a drilling fluid suspension into the wellbore in the subterranean geological formation,
wherein the drilling fluid suspension comprises bentonite, xanthan gum, starch, potassium hydroxide, and a layered triple hydroxide material comprising manganese, cobalt, and iron,
wherein the drilling fluid suspension has a pH of 10 or more,
wherein the layered triple hydroxide material is present in an amount of 0.01 to 0.5 percent by weight of the drilling fluid suspension,
circulating the drilling fluid suspension in the subterranean geological formation and forming a water-based mud; and
scavenging the hydrogen sulfide from the subterranean geological formation by reacting the hydrogen sulfide with the layered triple hydroxide material in the water-based mud.

2. The method of claim 1, wherein a molar ratio of manganese to cobalt to iron is 1-3:0.5-2:0.5-2 in the layered triple hydroxide material.

3. The method of claim 1, wherein a molar ratio of manganese to cobalt to iron is 2:1:1 in the layered triple hydroxide material.

4. The method of claim 1, wherein the layered triple hydroxide material has a breakthrough capacity of 150 to 180 mg of hydrogen sulfide per gram of the layered triple hydroxide.

5. The method of claim 1, wherein the layered triple hydroxide material has a saturation capacity of 210 to 250 mg of hydrogen sulfide per gram of the layered triple hydroxide.

6. The method of claim 1, wherein the drilling fluid suspension further comprises a polysaccharide and a carbonate.

7. The method of claim 1, wherein a breakthrough time for the hydrogen sulfide in the presence of the drilling fluid suspension is 5 to 10 times greater compared to a breakthrough time for the hydrogen sulfide in the presence of the drilling fluid suspension without the layered triple hydroxide material.

8. The method of claim 1, wherein a saturation time for the hydrogen sulfide in the presence of the drilling fluid suspension is 1 to 3 times greater compared to a saturation time for the hydrogen sulfide in the presence of the drilling fluid suspension without the layered triple hydroxide material.

9. The method of claim 1, wherein a breakthrough capacity for the hydrogen sulfide in the presence of the drilling fluid suspension is 5 to 10 times greater compared to a breakthrough capacity for the hydrogen sulfide in the presence of the drilling fluid suspension without the layered triple hydroxide material.

10. The method of claim 1, wherein a saturation capacity for the hydrogen sulfide in the presence of the drilling fluid suspension is 1 to 3 times greater compared to a saturation capacity for the hydrogen sulfide in the presence of the drilling fluid suspension without the layered triple hydroxide material.

11. The method of claim 1, wherein a plastic viscosity of the drilling fluid suspension is 0.8 to 1.2 times greater compared to a plastic viscosity of the drilling fluid suspension without the layered triple hydroxide material.

12. The method of claim 1, wherein an apparent viscosity of the drilling fluid suspension is 0.8 to 1.2 times greater compared to an apparent viscosity of the drilling fluid suspension without the layered triple hydroxide material.

13. The method of claim 1, wherein a yield point of the drilling fluid suspension is 1.1 to 1.3 times greater compared to a yield point of the drilling fluid suspension without the layered triple hydroxide material.

14. The method of claim 1, wherein a carrying capacity of the drilling fluid suspension is 1.1 to 1.4 times greater compared to a carrying capacity of the drilling fluid suspension without the layered triple hydroxide material.

15. The method of claim 1, wherein a fluid loss of the drilling fluid suspension is 0.9 to 1.2 times greater compared to a fluid loss of the drilling fluid suspension without the layered triple hydroxide material.

16. The method of claim 1, wherein the scavenging hydrogen sulfide converts the hydrogen sulfide into an elemental sulfur and an insoluble sulfide.

17. The method of claim 1, wherein a gel strength of the drilling fluid suspension at a time of 10 seconds is 0.9 to 1.3 times greater compared to a gel strength of the drilling fluid suspension without the layered triple hydroxide material at a time of 10 seconds.

18. The method of claim 1, wherein a gel strength of the drilling fluid suspension at a time of 10 minutes is 0.9 to 1.3 times greater compared to a gel strength of the drilling fluid suspension without the layered triple hydroxide material at a time of 10 minutes.

19. The method of claim 1, wherein the layered triple hydroxide material is made by a process, comprising:
dissolving a manganese salt, a cobalt salt, and an iron salt in water to form a metallic solution;
dissolving a base and a carbonate salt to form an alkali solution;
adding dropwise the metallic solution and the alkali solution to water and stirring to form a first solution;
stirring the first solution for 20 to 40 minutes to form a product;
hydrothermally treating the product at a temperature from 120 to 180° C. for a time of 12 to 36 hours to form the layered triple hydroxide material; and
drying the layered triple hydroxide material at a temperature of 60 to 100° C.

20. The method of claim 1, wherein the drilling fluid suspension has a density of 2 to 20 parts per gram (ppg).

* * * * *